United States Patent [19]

Korenowski

[11] 4,140,772
[45] Feb. 20, 1979

[54] STABILIZED HYDROGEN PEROXIDE SOLUTIONS

[75] Inventor: Theodore F. Korenowski, Branford, Conn.

[73] Assignee: Dart Industries Inc., Los Angeles, Calif.

[21] Appl. No.: 879,554

[22] Filed: Feb. 21, 1978

[51] Int. Cl.² .............................................. C01B 15/02
[52] U.S. Cl. ................................... 423/272; 423/273; 423/584
[58] Field of Search ...................... 423/272, 273, 584; 252/186

[56] References Cited

U.S. PATENT DOCUMENTS 3,706,671  12/1972  Hardy .................................. 252/186
3,948,795  4/1976  Kawabe ............................... 423/272

*Primary Examiner*—O. R. Vertiz
*Assistant Examiner*—Wayne A. Langel
*Attorney, Agent, or Firm*—Margareta LeMaire; Bryant W. Brennan; Fred S. Valles

[57] ABSTRACT

Aqueous hydrogen peroxide solutions used in metal dissolution processes are effectively stabilized against decomposition caused by metal ion contaminants by addition of saccharin or an alkali-metal salt of saccharin to the solutions.

14 Claims, No Drawings

STABILIZED HYDROGEN PEROXIDE SOLUTIONS

BACKGROUND OF THE INVENTION

Hydrogen peroxide containing solutions are used in various processes for the dissolution of metals and metal oxides. Examples of such processes included pickling, bright dipping, pre-etching, etching, manufacture of filaments for light bulbs etc. Hydrogen peroxide, which is added to the acid treatment solutions for the purpose of promoting the disolution and/or to prevent the formation of toxic fumes during the dissolution, is consumed in these processes and has to be replenished at least on a periodic basis to maintain its concentration in the treatment solution within the effective range. Some of the heavy metals, most notably iron and copper, cause an instability of the hydrogen peroxide in solution, expecially as these heavy metal ions accumulate during use. A rapid catalytic decomposition of the hydrogen peroxide not related to its consumption during processing occurs, resulting in excessive quantities of hydrogen peroxide being lost from the processing solution. In the past, various stabilizers have been added to hydrogen peroxide to protect it from decomposition in storage and shipping from trace quantities of these metals. Other stabilizers have been formulated to stabilize the hydrogen peroxide content of metal processing solutions. Compounds such as low molecular weight carboxylic acids and alcohols have been shown to have a retarding effect of hydrogen peroxide composition. Other known inhibitors include glycerine, glycols, polyglycols, phenol, p-methoxy phenol, alkyl and aryl sulphonic acids, sulfathiazole, phenacetin, 9-hydroxy quinoline, urea and amino pyridine. In general, the above mentioned hydrogen peroxide stabilizers have not been entirely satisfactory, for various reasons, such as insufficient stability at elevated process temperatures, obnoxious odors, excessive volatility, problems of undesirable side reactions with metal ions causing the formation of insoluble by-products, high costs, toxicity, etc.

It is therefore a primary object of the present invention to provide a new and improved metal dissolution process solution containing hydrogen peroxide stabilized against decomposition by the dissolved heavy metals contained therein. Another object is to provide a method for stabilizing hydrogen peroxide solutions against the degrading effect by heavy metal ions. Still another object is to provide a novel process for the pickling of copper and copper alloys.

Other objects will become readily apparent from a reading of the specification and appended claims.

THE INVENTION

According to the present invention it has been found that aqueous hydrogen peroxide solutions are effectively stabilized against decomposition by heavy metal ion contaminants if the solutions contain saccharin or an alkali metal salt of saccharin in quantities ranging from about 0.2g/l to the saturation of the solution. It should be understood that in this context the term "solution" applies to the various aqueous metal treating solutions which are prepared in situ by the user and are based on hydrogen peroxide and acids and mixtures of acids. The concentrations given throughout this specification are therefore based on the total amount of the hydrogen peroxide containing solution.

In an acid-hydrogen peroxide metal treatment solution the saccharin stabilizer is incorporated in amounts broadly ranging from about 0.2 grams/liter to the solubility of the stabilizer in the system. Solubility will depend on the make-up of the processing solutions and temperature. Higher dissolved salt and/or acid content depresses solubility while higher temperature increases solubility. Preferably at least about 0.5 grams/liter is used, most preferably at least about 1 gram/liter. It should be understood that it is also within the scope of this invention to add the saccharin compound in amounts which are in excess of its solubility, to provide a self regulating reservoir of stabilizer in the system. The stabilizer is advantageously provided in the form of a concentrated aqueous solution of an alkali metal salt of saccharin, such as sodium saccharin, which is converted in situ to saccharin by the action of the acid.

The hydrogen peroxide concentration of the metal treatment solution generally may vary over a wide range, e.g. from about 5 to 200 grams/liter on a free basis. Pickling solutions for the cleaning of metals such as copper, brass, aluminum, steel and the like usually contain between about 5 and about 50 grams of hydrogen peroxide per liter. In bright dipping of copper and copper alloys a concentration of from about 5 to about 40g/liter is commonly used, while in chemical milling of steel the concentration is generally between about 10 and about 50 grams per liter. In copper etching processes usual concentrations are in the range of 50–200 g/l.

Similarly, the acid component or components and the concentrations thereof in the solution may vary considerably depending upon the particular application for which the solution is intended. However, they are not variables affecting the stabilization of the hydrogen peroxide component. Thus, the solutions can be based on any of the acids and mixtures of acids used in metal dissolution processes including sulfuric acid, nitric acid, phosphoric acid, hydrochloric acid, hydrofluoric acid, fluoroboric acid and the like, and their acid concentrations usually range between about 2 to about 400 grams/liter (free aid basis), although even higher concentrations may also be employed. For instance low acid concentrations typically in the range of about 2 to about 100 grams/liter are used in the cleaning of steel, copper, zinc, etc. while relatively high acid concentrations up to about 300–400 grams/liter are used in the etching processes. In the pickling of copper and alloys of copper the acid concentration typically amounts to between about 100 to about 400 grams/liter.

Various other additives may of course be added to these solutions in suitable quantities for achievement of certain desired results, including catalysts and promoters for increase of metal dissolution rates, brighteners, passivating agents, leveling agents, etc.

The stabilized metal treatment solutions of this invention are used with advantage in any metal dissolution process resulting in the accumulation in the solution of metal ions which have degrading effect on the hydrogen peroxide stability. Examples of such processes include etching, chemical milling, pickling, bright dipping and polishing of metals as well as processes for the manufacture of tungsten filaments for light bulbs and others. Metals dissolved in these processes include copper and alloys of copper, iron, steel, nickel, cadmium, zinc, aluminum, molybdenum, lead and the like.

The saccharin additives used in this invention have an excellent stabilizing effect upon aqueous hydrogen peroxide solutions, thereby extending their usefulness to a remarkable degree in the processes where they are employed. In addition, they exhibit other qualities which are highly desirable in that they are readily available, stable, non-volatile, non-toxic, odor-free compounds, which do not form undesirable by-proucts with metal ions in use.

For a better understanding of the invention, the following examples are provided.

EXAMPLES 1 AND 2

These comparative examples demonstrate the excellent stabilizing effect obtained by addition of sodium saccharin to a copper pickling solution containing appreciable quantities of copper ions. Solutions were prepared, each having a volume of 400 ml and containing 265 grams/liter $H_2SO_4$ and 30.6 grams/liter of copper ion (added as equivalent amount of copper sulfate pentahydrate). These solutions were placed in a constant temperature bath maintained at 120° F. and additions were made of hydrogen peroxide and sodium saccharin in the concentrations shown in Table I. After 21.5 hours, the two solutions were analyzed for hydrogen peroxide, the results being shown in the table.

Table 1

| Ex. No. | Sodium Saccharin g/l | $H_2O_2$ conc. - g/l Initial | $H_2O_2$ conc. - g/l After 21.5 hrs. | Rate of $H_2O_2$ loss g/l/hr. |
|---|---|---|---|---|
| 1 | 0 | 12.19 | 0.0 | — |
| 2 | 1.0 | 12.72 | 11.10 | 0.075 |

EXAMPLES 3-5

In these examples, an investigation was made regarding the effect on stability of varying amounts of sodium saccharin additions to copper pickling solutions. The procedure of the previous examples was followed except that the duration of the experiments were now 29.5 hours. The results are shown in Table II below.

Table II

| Ex. No. | Sodium Saccharin g/l | $H_2O_2$ Conc. - g/l Initial | $H_2O_2$ Conc. - g/l After 29.5 hrs. | Rate of $H_2O_2$ loss g/l/hr |
|---|---|---|---|---|
| 3 | 0.2 | 11.05 | 7.23 | 0.13 |
| 4 | 0.5 | 11.41 | 8.33 | 0.10 |
| 5 | 3.0(1) | 11.35 | 10.17 | 0.04 |

(1)Initially not completely soluble; complete solution achieved in 4-5 hours.

EXAMPLES 6-8

When excessive hydrogen peroxide instability develops in a copper pickling system, it is often found that iron contamination of the pickling bath is an additional source of the problem. This is a common condition, because of many of the pickling tanks are made of stainless steel as are the chains, hooks and rails. The following comparative examples demonstrate the excellent ability of sodium saccharin to alleviate the detrimental effect of soluble iron on the peroxide stability. The procedures of Example 1 were followed in making up the bath solutions except that each of these also contained 500 mg/l of soluble iron, added as an equivalent amount of ferrous sulfate, and the tests were carried out for a period of 21 hours. The results are tabulated in TABLE III Table III

| Ex. No. | Sodium Saccharin g/l | $H_2O_2$ conc. - g/l Initial | $H_2O_2$ conc. - g/l After 21 hrs. | Rate of $H_2O_2$ loss g/l/hr. |
|---|---|---|---|---|
| 6 | 0 | 12.36 | 0.0 | — |
| 7 | 1.0 | 12.29 | 8.74 | 0.17 |
| 8 | 3.0 | 12.17 | 9.28 | 0.14 |

It is obvious to those skilled in the art that many variations and modifications can be made to the specific embodiments discussed above. All such departures from the foregoing specification are considered within the scope of this invention as defined by this specification and the appended claims.

What is claimed is:

1. An aqueous hydrogen peroxide solution stabilzed against degradation by metal ions, which solution contains a stabilizing compound selected from saccharin and the alkali metal salts of saccharin in amounts from about 0.2 grams/liter to the solubility of the stabilizing compound in the solution.

2. The stabilized hydrogen peroxide solution of claim 1 also containing from about 2 to about 400 grams/liter of a mineral acid on a free basis.

3. The acidified stabilized hydrogen peroxide solution of claim 2 containing at least about 0.5 grams/liter of the stabilizing compound.

4. The acidified stabilized hydrogen peroxide solution of claim 2 containing at least about 1 gram/liter of the stabilizing compound.

5. The acidified stabilized hydrogen peroxide solution of claim 2 wherein the mineral acid is sulfuric acid.

6. The acidified stabilized hydrogen peroxide solution of claim 2 wherein the hydrogen peroxide concentration is maintained between about 5 and about 200 grams/liter on a free basis.

7. The stabilized hydrogen peroxide solution of claim 1, wherein the saccharin compound is sodium saccharin.

8. A method of stabilizing an aqueous hydrogen peroxide solution against degradation of metal ions which comprises incroporating in said solution a stabilizing compound selected from saccharin and the alkali metal salts of saccharin in amounts from about 0.2 grams/liter to the solubility of the stabilizing compound in the solution.

9. The method of claim 8, in which from about 2 to about 400 grams/liter of mineral acid on a free basis is incorporated in the solution.

10. The method of claim 9, in which about 0.5 grams/liter of the stabilizing compound is incorporated in the solution.

11. The method of claim 9, in which at least about 1 gram/liter of the stabilizing compound is incorporated in the solution.

12. The method of claim 9 wherein the mineral acid is sulfuric acid.

13. The method of claim 9, wherein the hydrogen peroxide concentration of the solution is maintained between about 5 and about 200 grams/liter ona free basis.

14. The method of claim 8, wherein the saccharin compound is sodium saccharin.